(No Model.)
E. DANNER.
CHURN.
No. 507,788. Patented Oct. 31, 1893.
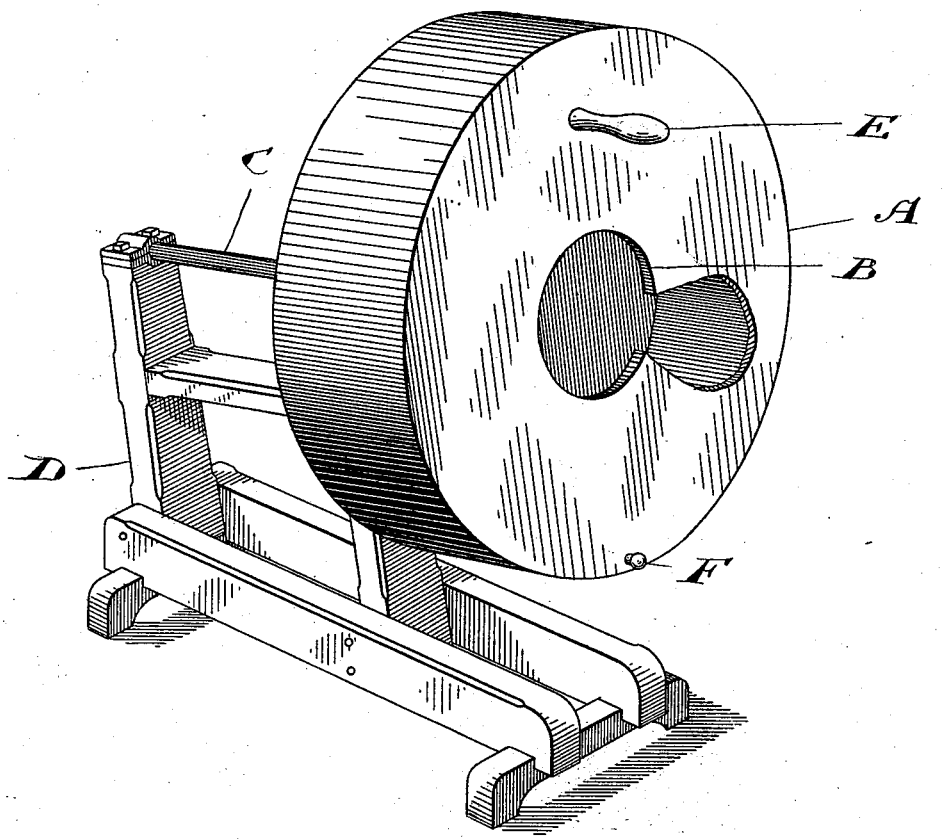
Witnesses
J. Edw. Maybee
W. J. McMillan
Inventor
Eli Danner
by Donald C. Ridout & Co
Attys.

UNITED STATES PATENT OFFICE.

ELI DANNER, OF WILLOUGHBY, CANADA.

CHURN.

SPECIFICATION forming part of Letters Patent No. 507,788, dated October 31, 1893.

Application filed April 19, 1893. Serial No. 470,941. (No model.)

*To all whom it may concern:*

Be it known that I, ELI DANNER, residing in the township of Willoughby, Black Creek P. O., county of Welland, and Province of Ontario, Canada, have invented a certain new and useful Improvement in Churns, of which the following is a specification.

The object of the invention is to produce an easily worked churn in which the cream remains open to the atmosphere in course of churning, but which will neither spill nor splash during the said process, and it consists of a cylinder having a hole at one end in the center of its periphery, the said cylinder being carried at an angle and revolved with its periphery, substantially as hereinafter more particularly explained.

The drawing is a perspective view of my improved churn in position for churning.

In the drawing—A, is a cylinder of any suitable size, but in practice I have found that twenty-eight inches in diameter and eight inches long will be found a suitable size. The cylinder A, is perfectly smooth in its interior and has a hole B, made at one end exactly in its center. At the opposite end and exactly in the center of the cylinder A, I fix in a suitable manner a spindle C, which is suitably journaled in the frame D, at an angle of about eighty degrees. The back frame of the post D is so shaped and arranged that the frame and churn may be turned backward and supported by said post and the hinder part of the base, and when the churn is thus turned backward the end of the cylinder A, lies horizontally so that the cream may be poured into the hole B. After the required quantity of cream is poured into the cylinder A, the frame D, is turned over so that the cylinder will lie in the position indicated in the drawing. The handle E, is then seized and the cylinder A, is caused to revolve rapidly and as the cylinder lies at an angle as indicated, the friction of the closed end of the cylinder A, acting on the cream causes the cream to be concaved away from the opening or hole B, thus holding the cream so that it cannot splash out and at the same time cause a rolling motion of the cream, agitating it sufficiently to produce the desired butter.

By keeping the hole B, open, the cylinder A, is perfectly ventilated, all the gas produced by the churning escaping through the said hole while the necessary fresh air is constantly supplied.

When the butter is produced the buttermilk is drawn off by removing the plug F.

What I claim as my invention is—

1. In a churn, a cylinder provided with two heads, a shaft attached to one of said heads, and the other having an opening therein, in combination with a frame for the support of said shaft and cylinder, having one of its ends constructed to support the cylinder in a horizontal position for filling and its bottom constructed to support said cylinder in a vertical position for operating, substantially as described.

2. As an improved churn, a cylinder provided with two heads, a shaft attached to one of said heads, and mounted at a slight departure from a horizontal line, and the other having an opening to receive the cream, and a handle to turn said cylinder, in combination with a frame, having one of its ends constructed to support the cylinder in a horizontal position for filling, and its bottom constructed to support said cylinder in a vertical position for operating, substantially as described and shown.

Toronto, March 22, 1893.

ELI DANNER.

In presence of—
  A. M. NEFF,
  J. EDW. MAYBEE.